G. E. MOEN.
VALVE.
APPLICATION FILED APR. 27, 1911.
1,003,488.
Patented Sept. 19, 1911.
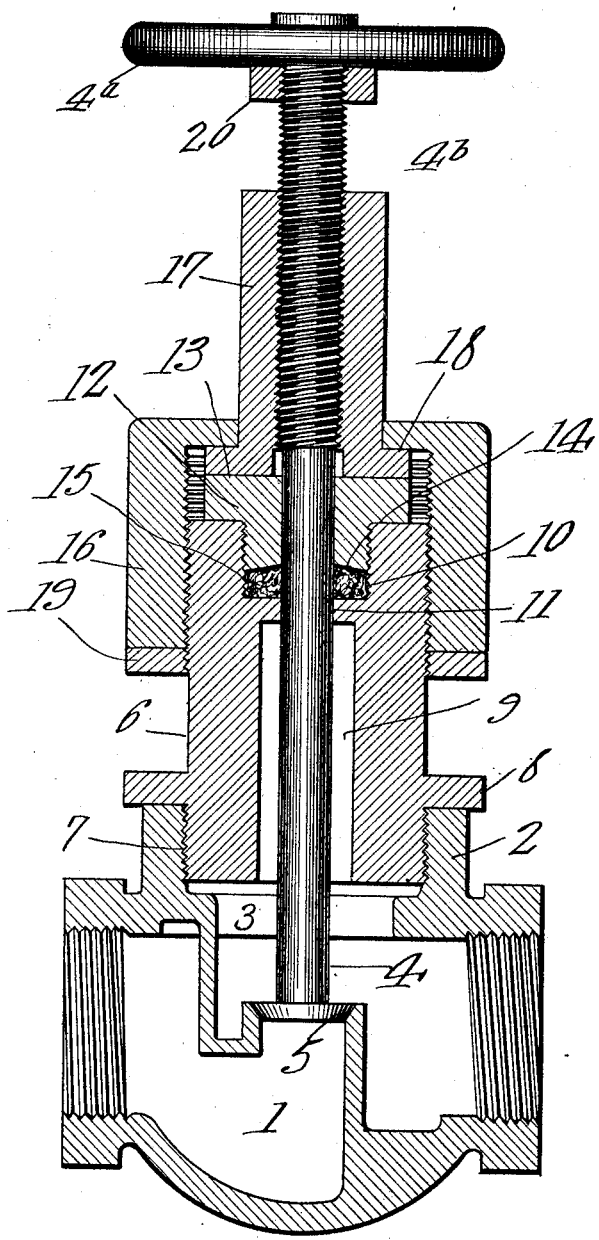
Witnesses
George E. Moen,
Inventor
by
Attorneys

UNITED STATES PATENT OFFICE.

GEORGE ELMER MOEN, OF SPIRIT LAKE, IDAHO.

VALVE.

1,003,488. Specification of Letters Patent. Patented Sept. 19, 1911.

Application filed April 27, 1911. Serial No. 623,766.

*To all whom it may concern:*

Be it known that I, GEORGE E. MOEN, a citizen of the United States, residing at Spirit Lake, in the county of Kootenai and State of Idaho, have invented a new and useful Valve, of which the following is a specification.

This invention relates to improvements, especially in steam valves and as applicable for almost any form thereof, including the globe type, gage cocks, "boiler checks," etc.

The invention has for its object, primarily, to provide for readily regrinding the valve face and seat whenever this may become necessary.

A further object is to enable this to be done without shutting off steam pressure, which is imperative in effecting the regrinding of valves of the usual or ordinary types of construction.

A still further object is to carry out this end in a simple, ready, and effective manner and without exposure to the action of the steam.

The invention consists of certain instrumentalities and features substantially as hereinafter fully disclosed and defined in the claims.

In the accompanying drawing, illustrating the preferred embodiment of my invention, wherein it will be understood that various changes and modifications as relate to the details of the construction and arrangement of the parts may be made without departing from the spirit of the invention, the figure represents a longitudinal section of the valve.

In putting my invention into practice, I provide the valve casing 1, which may be of the ordinary form or type, or any approved type, with an internally threaded tubular or annular extension 2, around the opening 3, provided, as usual, for the passage of the valve stem 4, having as usual a hand wheel 4ª for its ready manipulation, the valve being designated as 5. A sleeve member 6, also screw threaded at its inner end as at 7, is suitably engaged with the screw thread of the part 2 for its attachment to the valve casing, said sleeve also being provided with an annular flange 8 to engage the outer end or surface of the extension 2 for obvious reasons, said sleeve also being preferably formed with a longitudinal chamber 9 of materially greater diameter or cross section than that of the valve stem and opening at one end into the valve chamber, said chamber 9 terminating at its opposite end some distance inwardly from the corresponding end of the sleeve 6. In this end of the sleeve 6 is formed a suitable space or recess 10 whose lateral walls are screw threaded for a purpose presently disclosed; and through the bottom of said recess is a passage 11, which closely conforms to the cross sectional outline of the valve stem 4 for the guidance of the latter.

A suitable packing nut or sleeve 12 for the valve stem 4, which sleeve or nut has a screw threaded surface engaging the screw threaded surface of the lateral walls of the recess or space 10 in the sleeve 6, is adapted to be suitably received by said recess to a certain depth, such reception being restricted or limited by a flange 13, upon the outer end of said nut or sleeve 12, engaging the opposite end of the sleeve 6, the inner end of said nut being preferably somewhat recessed or dished, as at 14.

A suitable packing 15 is interposed between the dished inner end of the nut 12 and the bottom of the recess 10, for suitably packing the valve stem, the dished surface of the nut serving to crowd or force the packing toward and effectively around, and in contact with said valve stem, as is clearly apparent.

A cap nut 16, having upon the inner circumference of its annular portion a screw threaded surface adapted to engage a screw threaded surface upon the outer circumference of the sleeve 6, at its outer end, is applied for holding a tubular member or sleeve 17 to the nut 12, said sleeve 17 having a flange 18 at one end engaging the flange 13 of the nut 12 and itself engaged by the nut or cap 16. Said tubular member or sleeve 17 receives, and has screw threaded connection with the valve stem 4, the latter being extended some distance, as at 4ᵇ, beyond the nut 12 and its flange 13 for that purpose; and upon the sleeve 6 is also arranged a lock or jam nut 19 having screw threaded connection with the latter and adapted to engage and provide for the retention of the cap nut 16 more effectively in place. The valve stem 4, is also provided with a nut 20, beyond the tubular member or sleeve 17, the function of which will be presently described.

It is apparent that by tightly forcing the cap nut 16 against the sleeve 17, the valve stem or spindle 4 may be readily turned or manipulated for moving its valve disk or member 5 to or away from the valve seat, and that the regrinding operation or action may be effected while under steam pressure. To that end, the cap nut 16 is suitably or slightly loosened and the valve stem actuated, so that the valve disk or member will rest upon, or engage its seat under the requisite pressure necessary for such grinding action. The nut 20 is now moved into contact or engagement with the sleeve 17, to provide for the conjoint or simultaneous turning of the valve stem 4 and said sleeve as the valve stem is again suitably actuated in performing the regrinding operation. As the valve seat wears slightly the nut 12 is required to be accordingly adjusted to compensate for such wear and pressure, that is the required pressure between the valve and its seat. The lock or jam nut 19 prevents casual turning of the cap nut 16 during the regrinding operation.

It is apparent from the foregoing that no steam will escape when the cap nut 16 is loosened, because the position of the packing nut 12 has not been disturbed, thus avoiding shutting off steam for carrying out the aforesaid operation and promoting or expediting such operation.

The invention is also characterized for simplicity, effectiveness in action and is readily adapted to be applied for use in connection with almost any form of steam valves, as previously stated, including the globe type, gage cocks, "boiler checks," etc.

I claim:

1. A valve of the character described, including a valve stem, a sleeve applied to the valve casing, a packing nut connected to said sleeve, an additional sleeve, connected to said valve stem, and a cap nut engaging said sleeves and holding said additional sleeve to said packing nut.

2. A valve of the character described, including a valve stem, a sleeve connected to the valve-casing, a packing nut connected to said sleeve, an additional sleeve connected to said valve stem, a cap nut effecting connection between said sleeves and holding one of said sleeves to said packing nut, and a lock or jam nut applied to said valve stem and adapted to engage said additional sleeve.

3. A valve of the type described, including a valve stem, a sleeve connected to the valve casing, a packing nut connected to said sleeve, an additional sleeve connected to said valve stem, a cap nut effecting connection between said sleeves, and a lock nut applied to the first referred to sleeve and engaging said cap nut.

4. A valve of the type described, including a valve stem, a sleeve connected to the valve casing, a packing nut connected to said sleeve, an additional sleeve connected to said valve stem, a cap nut effecting connection between said sleeves, and lock nuts, one applied to the first referred to sleeve and engaging said cap nut and the other applied to said valve stem and adapted to engage said additional sleeve.

In testimony that I claim the foregoing as my own, I have hereto affixed my signature in the presence of two witnesses.

GEORGE ELMER MOEN.

Witnesses:
GEORGE MITCHELL,
C. W. REARING.

---

Copies of this patent may be obtained for five cents each, by addressing the "Commissioner of Patents Washington, D. C."